(12) United States Patent
Singh et al.

(10) Patent No.: US 10,178,365 B1
(45) Date of Patent: Jan. 8, 2019

(54) SYSTEM AND METHOD FOR COMBINING AUDIO TRACKS WITH VIDEO FILES

(71) Applicant: Vid Inc., Los Angeles, CA (US)

(72) Inventors: Jagpal Singh, Worcester (GB); Maciej Dziedziela, Hertfordshire (GB)

(73) Assignee: VID INC., Los Angeles, CA (US)

( * ) Notice: Subject to any disclaimer, the term of this patent is extended or adjusted under 35 U.S.C. 154(b) by 0 days.

(21) Appl. No.: 15/686,842

(22) Filed: Aug. 25, 2017

(51) Int. Cl.
*G11B 27/036* (2006.01)
*H04N 21/233* (2011.01)
*H04N 9/802* (2006.01)
*H04N 21/2368* (2011.01)
*H04N 21/242* (2011.01)
*G10H 1/00* (2006.01)
*H04N 21/235* (2011.01)

(52) U.S. Cl.
CPC ........... *H04N 9/802* (2013.01); *G10H 1/0008* (2013.01); *G11B 27/036* (2013.01); *H04N 21/233* (2013.01); *H04N 21/2353* (2013.01); *H04N 21/2368* (2013.01); *H04N 21/242* (2013.01); *G10H 2210/076* (2013.01)

(58) Field of Classification Search
CPC .. H04N 9/802; H04N 21/233; H04N 21/2353; H04N 21/2368; G10H 1/0008; G10H 2210/076; G11B 27/036
See application file for complete search history.

(56) References Cited

U.S. PATENT DOCUMENTS

| 7,027,124 | B2 | 4/2006 | Foote et al. |
| 7,529,464 | B2 | 5/2009 | Cheng et al. |
| 7,904,798 | B2 | 3/2011 | Keng |
| 8,860,865 | B2 | 10/2014 | Dukellis et al. |
| 9,524,752 | B2 | 12/2016 | Rav-Acha et al. |
| 2010/0080532 | A1* | 4/2010 | Ubillos ................. G06F 3/0486 386/241 |
| 2012/0278731 | A1 | 11/2012 | Marinkovich et al. |
| 2013/0070093 | A1* | 3/2013 | Rivera ................. G11B 27/002 348/143 |
| 2014/0006415 | A1 | 1/2014 | Rubchinsky |
| 2014/0013246 | A1 | 1/2014 | Beechuk |

(Continued)

OTHER PUBLICATIONS

Collaborative Video Creation Platform \ We Video; http://www.wevideo.com/solutions/cvcp.

(Continued)

*Primary Examiner* — Huy T Nguyen
(74) *Attorney, Agent, or Firm* — Joseph V. Saphia; Haug Partners LLP

(57) ABSTRACT

A method for combining a plurality of video files with a tune and a recording medium storing an executable program for implementing the method. The method comprises transmitting a service request from an electronic device to a synchronizing server, wherein the service request includes meta information of a plurality of video files, a display order of the plurality of video files, and meta information of a tune, detecting a plurality of beats from the tune; and selecting, from the plurality of beats, a set of beats that synchronize with the plurality of the video files; and transmitting a service response from the synchronizing server to the electronic device, wherein the service response includes time frames associated with the set of beats.

22 Claims, 8 Drawing Sheets

(56) References Cited

U.S. PATENT DOCUMENTS

| | | | |
|---|---|---|---|
| 2014/0078398 A1* | 3/2014 | Shenoy | G11B 27/034 |
| | | | 348/515 |
| 2014/0173396 A1 | 6/2014 | Imbruce | |
| 2015/0139615 A1 | 5/2015 | Hill | |
| 2015/0149906 A1 | 5/2015 | Toff et al. | |
| 2015/0169142 A1 | 6/2015 | Longo | |
| 2015/0195426 A1 | 7/2015 | Merrill | |
| 2016/0012857 A1 | 1/2016 | Leppänen et al. | |
| 2016/0275108 A1 | 9/2016 | Sidener | |
| 2017/0169644 A1 | 6/2017 | Rubchinsky | |
| 2017/0337250 A1 | 11/2017 | Li | |

OTHER PUBLICATIONS

Weaverize / The "Google Docs" for video : an easy collaborative online video editor; http://www.weaverize.com.

International Search Report and Written Opinion issued in corresponding International Application No. PCT/US2018/047849 dated Sep. 21, 2018.

International Search Report and Written Opinion issued in corresponding International Application No. PCT/US2018/054641 dated Nov. 7, 2018.

\* cited by examiner

SYSTEM AND METHOD FOR COMBINING AUDIO TRACKS WITH VIDEO FILES

BACKGROUND

High definition cameras have become a common feature in all sorts of consumer electronic devices, ranging form computers to laptops, tablets, PDAs, and smart phones. Consumers can easily record videos in high quality and share them with friends across different social-media platforms, such as YouTube, Facebook, Snapchat and Instagram. With more and more videos being recorded and shared, it has become desirable for users to be able to improve those videos before being published on the internet such that their videos can stand out from all other accessible on-line videos. A popular way to make those consumer-recorded videos more interesting is to add a tune, such as a song, music, or dialogue, to a video, which is often not prepared when the video is taken.

The idea of using computers to make musical videos has been known for many years. But, the traditional video editing methods have several drawbacks when they are used in the present content creation and consumption environment. One drawback of the traditional methods is that they are often designed for professionals who have specialized knowledge and experience in film making or music composing. Most of today's content creators are common consumers who are not artists or musicians and cannot provide needed input to those traditional methods. Thus, there is a need to have a video editing product for every one that produces a high quality combination between video files and tunes. Another drawback of the traditional methods is that they are developed based on the assumption that both application programs and contents are stored on a local device, in which the expense, such as time and fee charges, associated with the transmission of the contents does not need to be considered. When the traditional methods are applied to the present network environment, it would require the transmission of actual contents from one device to another, which can take several minutes to complete. Such a long delay would not be desirable to a consumer who expects a real-time response in a few seconds.

SUMMARY

An objective of the present application is to provide a series of processes and algorithms that allow users easily create videos with very little knowledge in video editing. The series of processes and algorithms are capable of providing a response to a video editing request without the need of transmitting the actual video data to a server, thus reducing the response time and network traffic. The series of the processes and algorithms are also capable of uniformly combining a plurality of video files with a tune by using groups of beats of the tune that have similar features.

According to an aspect, the present application is directed to a method for combining a plurality of video files with a tune. The method comprises transmitting a service request from an electronic device to a synchronizing server, wherein the service request includes meta information of a plurality of video files, a display order of the plurality of video files, and meta information of a tune, detecting a plurality of beats from the tune; and selecting, from the plurality of beats, a set of beats that synchronize with the plurality of the video files; and transmitting a service response from the synchronizing server to the electronic device, wherein the service response includes time frames associated with the set of beats.

According to various embodiments, the service request includes length information of the plurality of the video files. The service request further includes a beat detection method selected by a user. The video data of the plurality of the video files is not transmitted to the synchronizing server. The detecting step detects the plurality of beats according to an onset method, a bass method, or a treble method. The selecting step further comprises clustering the plurality of detected beats into a plurality of groups; and assigning a rank to each of the plurality of groups, the rank being calculated based on a strength of beats included in each group, a distance between adjacent beats of each group, and a distance between extremities of each group. The selecting step further comprises determining a total length of the plurality of video files; and adjusting the total length of the plurality of video files to the length of the tune. When the total length of the plurality of video files is longer than the length of the tune, the plurality of video files are proportionally trimmed. When the total length of the plurality of video files is shorter than the length of the tune, the length of the tune is adjusted to fit with the video files. The set of beats are selected from a first group that has the highest rank. The selecting step searches a predetermined range around an end point of a video file for a suitable beat. When the first group fails to produce a suitable beat for a video file, the selecting step searches a beat within a second group that is at an immediate lower level than the first group.

According to another aspect, the present application is directed to a recording medium that stores an executable program that implements the various steps of the methods as set forth in the present application.

BRIEF DESCRIPTION OF THE DRAWINGS

The above and other objects, features, and advantages of various embodiments as set forth in the present disclosure will be more apparent from the following detailed description of embodiments taken in conjunction with the accompanying drawings.

DETAILED DESCRIPTION

It will be appreciated by those ordinarily skilled in the art that the foregoing brief description and the following detailed description are exemplary (i.e., illustrative) and explanatory of the subject matter as set forth in the present disclosure, but are not intended to be restrictive thereof or limiting of the advantages that can be achieved by the present disclosure in various implementations.

It is noted that in this disclosure and particularly in the claims and/or paragraphs, terms such as "comprises", "comprised", "comprising" and the like can have the meaning attributed to it in U.S. Patent law; e.g., they can mean "includes", "included", "including", and the like.

Figure 1:
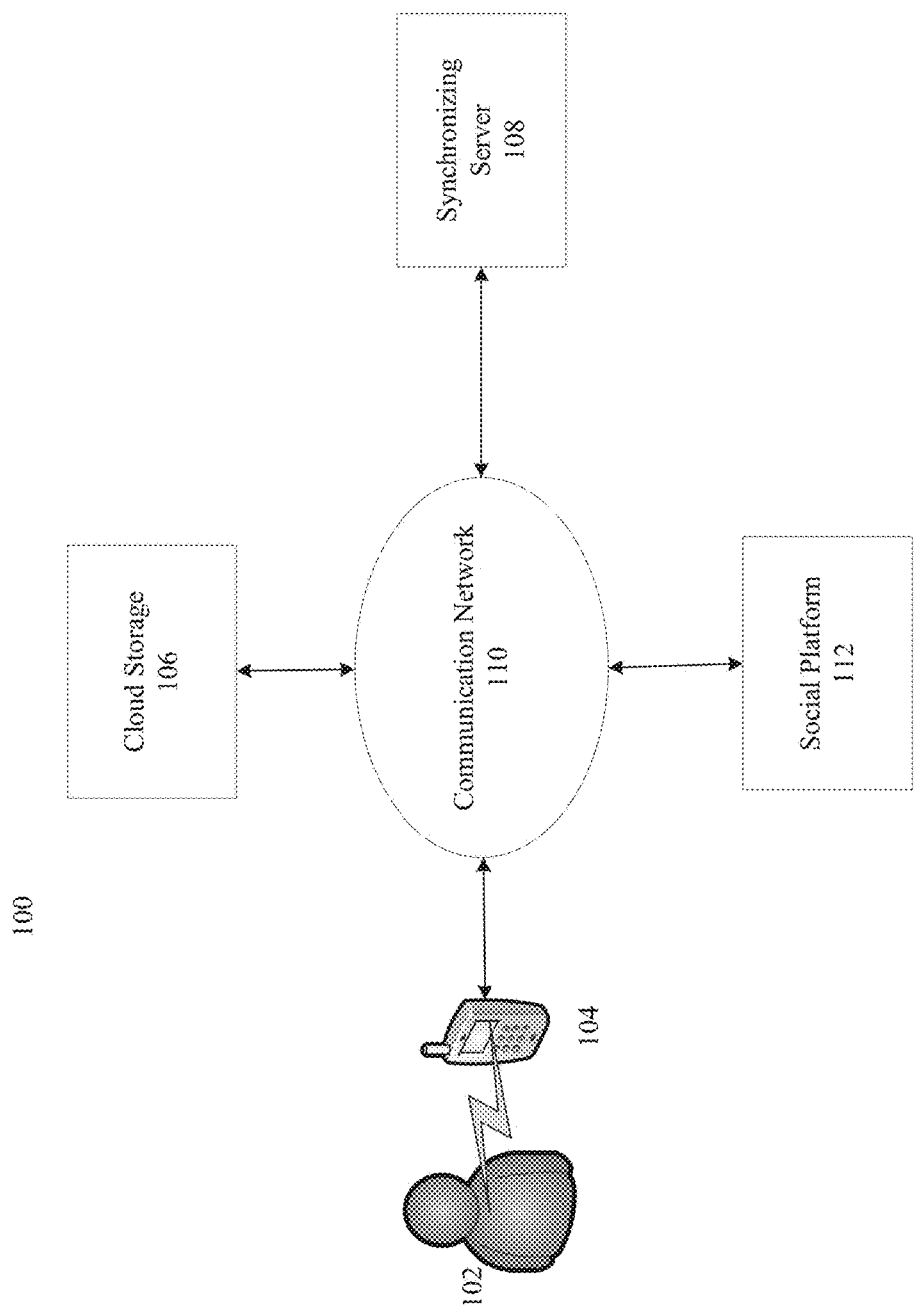
FIG. 1 illustrates a video editing system according to an embodiment of the present application.

FIG. 1 illustrates a video editing system 100 according to an embodiment of the present application. The video editing system includes a user 102 who operates an electronic device 104 to communicate with, via a communication network 110, a cloud storage 106, a synchronizing server 108, and a social platform 112. The user 102 may use the electronic device 104 to record and store a plurality of video files or may use the cloud storage 106 to store the plurality of video files. The user 102 may also select one or more videos file to be published on a social platform 112. Before making a publication, the user 102 may desire to add a tune to selected video files to enhance the video presentation. The synchronizing server 108 provides a series of processes and algorithms that assist the user 102 to synchronize the selected tune with the selected video files. In an operation, the user 102 may operate the mobile electronic device 104 to send a video editing request to the synchronizing server, which processes the video editing request and send a video editing response back to the electronic device 104. An advantage of the present system is that it does not require the transmission of actual video data between the electronic device 104 and the synchronizing server 108. In one embodiment, meta information, rather than the actual video data, is included in the video editing request and response such that the network traffic is reduced and the time for transmitting video data is not needed. Another advantage of the present system is that the synchronizing server 108 is capable of identifying a plurality beats in a tune, clustering similar beats into a same group, and then adding a selected group of beats to a plurality of video files selected by the user, thus enhancing the video presentation.

As used in the present application, a server, a system, a cloud storage, or an electronic device may comprise a full-sized personal computer, a mobile device, a wearable device, or even a virtual device capable of exchanging data over a network. For example, a server, a system, or an electronic device may be an iPhone, an Android phone, a Blackberry phone, an iWatch, an iPad, or other inter/let-capable devices. The virtual device as used in the present application may refer to those virtual representations of a physical device, which is created by virtual reality technologies.

The communication network 110 should be broadly construed to include any one or more of a number of types of networks that may be created between devices using an internet connection, a LAN/WAN connection, a wireless connection, and so forth. For example, an electronic device may be operatively connected to network 110, via 3G, 4G, 5G, or LTE networks. The terms "coupled with," "operatively connected," "operatively coupled," and "communicatively coupled", as used herein, mean that the elements so connected or coupled are adapted to transmit and/or receive data, or otherwise communicate. The communication network 110 may comprise various configurations and protocols including a cable network, the internet, World Wide Web, intranets, virtual private networks, wide area networks, local networks, private networks using communication protocols proprietary to one or more companies, Ethernet, WiFi and HTTP, cloud and cloud based services, and various combinations of the foregoing.

Figure 2:
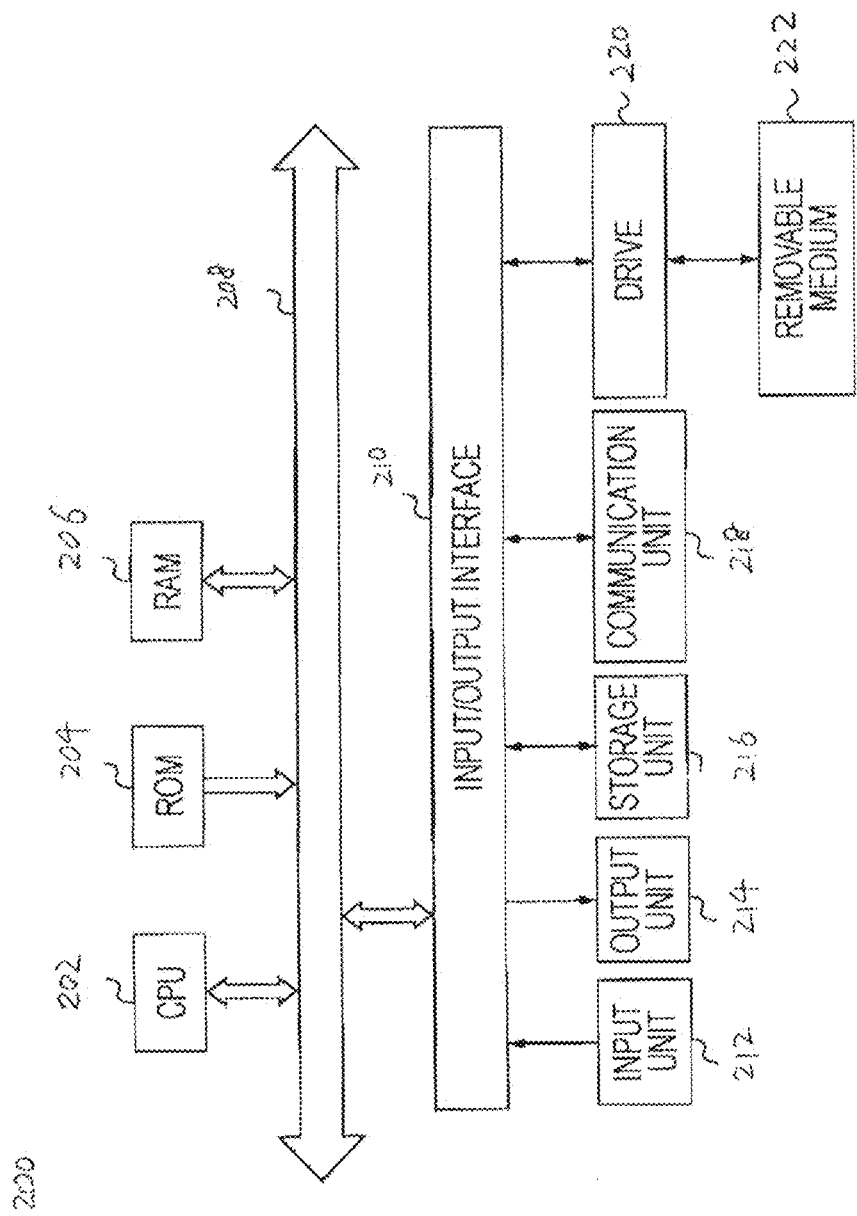
FIG. 2 illustrates an exemplary structure of an electronic device according to an embodiment of the present application.

FIG. 2 illustrates an exemplary structure 200 of a server, a system, or an electronic device according to an embodiment. The exemplary structure 200 includes a CPU 202, a ROM 204, a RAM 206, a bus 208, an input/output interface 210, an input unit 212, an output unit 214, a storage unit 216, a communication unit 218, and a drive 220. The CPU 202, the ROM 204, and the RAM 206 are interconnected to one another via the bus 208, and the input/output interface 210 is also connected to the bus 208. In addition to the bus 208, the input unit 212, the output unit 214, the storage unit 216, the communication unit 218, and the drive 220 are connected to the input/output interface 210.

The CPU 202, such as a microprocessor, executes various kinds of processing in accordance with a program stored in the ROM 204 or in accordance with a program loaded into the RAM 206 from the storage unit 216 via the input/output interface 210 and the bus 208. The ROM 204 has stored therein a program to be executed by the CPU 202. The RAM 206 stores as appropriate a program to be executed by the CPU 202, and data necessary for the CPU 202 to execute various kinds of processing. The CPU 202 may include multiple processors such as ASICs, FPGAs, GPUs, etc. A program may include any set of instructions to be executed directly (such as machine code) or indirectly (such as scripts) by the processor. In that regard, the terms "instructions," "steps" and "programs" may be used interchangeably herein. The instructions may be stored in object code format for direct processing by the processor, or in any other computer language including scripts or collections of independent source code modules that are interpreted on demand or compiled in advance. Functions, methods and routines of the instructions are explained in more detail below.

The input unit 212 includes a keyboard, a mouse, a microphone, a touch screen, and the like. When the input unit 212 is operated by a user, the input unit 212 supplies an input signal based on the operation to the CPU 202 via the input/output interface 210 and the bus 208. The output unit 214 includes a display, such as an LCD, or a touch screen or a speaker, and the like. The storage unit 216 includes a hard disk, a flash memory, and the like, and stores a program executed by the CPU 202, data transmitted to the terminal 200 via a network, and the like.

The communication unit 218 includes a modem, a terminal adaptor, and other communication interfaces, and performs a communication process via the networks of FIG. 1.

A removable medium 222 formed of a magnetic disk, an optical disc, a magneto-optical disc, flash or EEPROM, SDSC (standard-capacity) card (SD card), or a semiconductor memory is loaded as appropriate into the drive 220. The drive 220 reads data recorded on the removable medium 222 or records predetermined data on the removable medium 222.

An operating system such as Microsoft Windows 10®, Microsoft Windows 7®, Windows XP® or Vista™, Linux®, Mac OS®, Unix®, iOS®, or Android®, may be used by the terminal. Other programs may be stored instead of or in addition to the operating system. It will be appreciated that a computer system may also be implemented on platforms and operating systems other than those mentioned. Any operating system or other program, or any part of either, may be written using one or more programming languages such as, e.g., Java®, C, C++, C#, Visual Basic®, VB.NET®, Perl, Ruby, Python, SWIFT, OBJECTC, or other programming languages, possibly using object oriented design and/or coding techniques.

Data may be retrieved, stored or modified in accordance with the instructions. For instance, although the system and method is not limited by any particular data structure, the data may be stored in computer registers, in a relational database as a table having a plurality of different fields and records, XML documents, flat files, JSON files, etc. The data may also be formatted in any computer-readable format such as, but not limited to, binary values, ASCII or Unicode. The textual data might also be compressed, encrypted, or both. By further way of example only, image data may be stored as bitmaps comprised of pixels that are stored in compressed or uncompressed, or lossless or lossy formats (e.g., JPEG), vector-based formats (e.g., SVG) or computer instructions for drawing graphics. Video data may be encoded in a plurality of encoding formats, such as H.246 and MPEG, and stored as AVI, MP4, MOV, or M4V files. Audio data may also be encoded in a plurality of encoding formats, such as AAC, AMR, and MPE, and stores as MPE or WAV files. Moreover, the data may comprise any information sufficient to identify the relevant information, such as numbers, descriptive text, proprietary codes, pointers, references to data stored in other memories (including other network locations) or information that is used by a function to calculate the relevant data.

It will be understood by those of ordinary skill in the art that the processor and memory may actually comprise multiple processors and memories that may or may not be stored within the same physical housing. For example, some of the instructions and data may be stored on removable memory such as a magneto-optical disk or SD card and others within a read-only computer chip. Some or all of the instructions and data may be stored in a location physically remote from, yet still accessible by, the processor. Similarly, the processor may actually comprise a collection of processors which may or may not operate in parallel. As will be recognized by those skilled in the relevant art, the terms "system," "terminal," and "server" are used herein to describe a computer's function in a particular context. A terminal may, for example, be a computer that one or more users work with directly, e.g., through a keyboard and monitor directly coupled to the computer system. Terminals may also include a smart phone device, a personal digital assistant (PDA), thin client, or any electronic device that is able to connect to the network and has some software and computing capabilities such that it can interact with the system. A computer system or terminal that requests a service through a network is often referred to as a client, and a computer system or terminal that provides a service is often referred to as a server. A server may provide contents, content sharing, social networking, storage, search, or data mining services to another computer system or terminal. However, any particular computing device may be indistinguishable in its hardware, configuration, operating system, and/or other software from a client, server, or both. The terms "client" and "server" may describe programs and running processes instead of or in addition to their application to computer systems described above. Generally, a (software) client may consume information and/or computational services provided by a (software) server.

Figure 3:
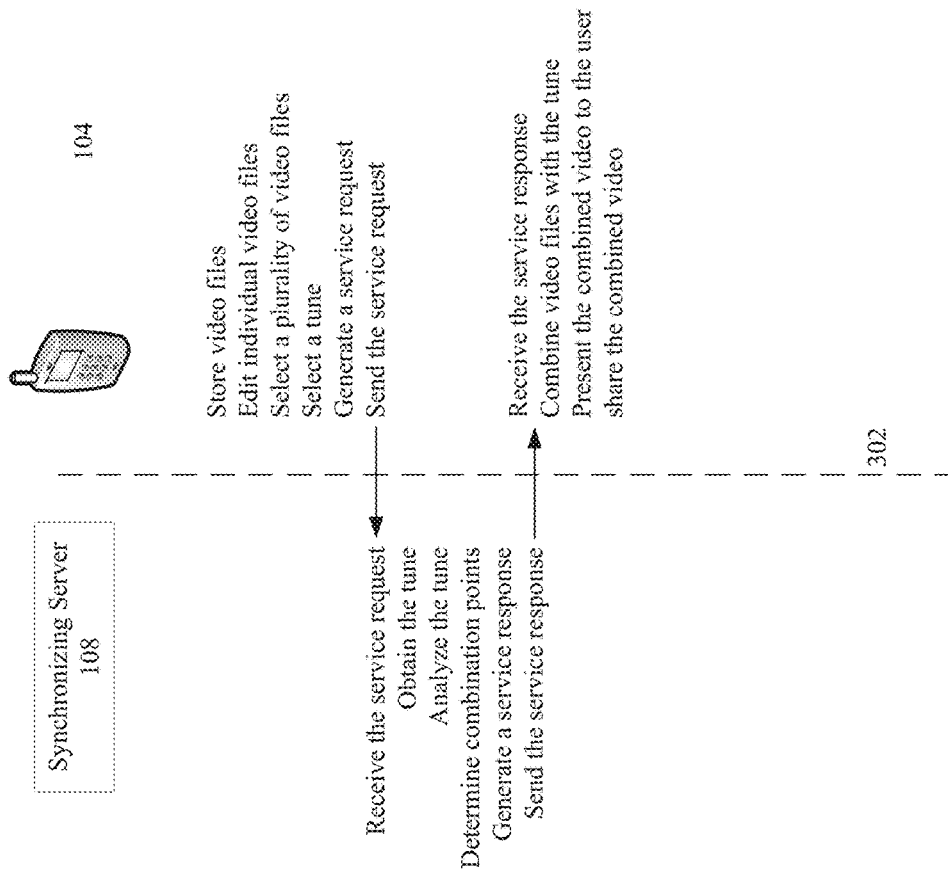
FIG. 3 illustrates a division of tasks between a synchronizing server and an electronic device according to an embodiment of the present application.

FIG. 3 illustrates a division of video editing tasks between the synchronizing server 108 and the electronic device 104 according to an embodiment of the present application. The dash line 302 represents a communication network. The division of tasks between the synchronizing server 108 and the electronic device 104 is design to minimize data transmission between the synchronizing server and the electronic device and to take advantage of the powerful video editing capability of the electronic device 104. In one embodiment, the actual video editing process is implemented locally at the electronic device, thus avoiding the transmission of the actual video file between the electronic device and the synchronizing server. For example, the iOS platform that is used by iPhones provides APIs (Application Programming Interface), known as AVFoundation, that have the full featured framework for working with time-based audiovisual media on iOS. A developer, using AVFoundation, can easily design local functions for playing, creating, and editing video files. For electronic devices that operate an Android system, FFMPEG represents an equivalent of AVFoundation, which can be used for local video editing.

According to the an embodiment of the division of tasks, when a service from the synchronizing service is needed, the electronic device transmits a service request to the synchronizing server, which has the meta information of selected video files, and meta data of any additional data that may need to be added to the video files. The meta data of the video files includes the descriptive data of the video files that are needed for the video editing. For example, the meta data may include identification of selected video files, the length and format of each video file, and a user-preferred display order of the selected video files. The meta data of the additional data may simply include identification of those additional data, such as the name of a song. In response, the synchronizing server determines how the additional data and the plurality of video files are synchronized and transmits a service response, which includes information about the synchronization, back to the electronic device. In this way, both the network traffic and the response time perceived by the user are greatly reduced.

According to one embodiment, the additional data to be added to video files includes a tune, such as a song, a piece of music or a dialogue, which is to be used as background for the video files. The service request may not only include the meta information of a tune, such as identification information of the tune and the name of the artist, but also the actual data of the tune because the amount of data associated with a tune is relatively small. When a tune is to be added to several video files, the service response includes the values of a plurality of time frames that is selected from the tune, which represent the synchronizing points with the video files. In addition, the service response may, optionally, include length adjustment information of each video file when the length of the tune and the total length of the video files do not match each other. The length adjustment information may be video trimming information or video extension information. The algorithms for determining the synchronization points and trimming information represent another advantage of the present application over the conventional methods and will be described in detail in the following paragraphs of this application.

As shown in FIG. 3, the electronic device 104 has an mobile application that implements the following tasks to: generate and store a plurality of video files, edit those video files from time to time, allow a user to select a plurality of video files and a tune for combination, generate a service request including meta data of the selected video files and the tune, and transmit the service request to the synchronizing server. In addition, the electronic device 104, after receiving a service response, combines the plurality of video files with the tune according to the synchronization information included in the service response and presents the combined video file to the user. The electronic device may also provide functions for the user to share the combined video on a social platform or share the combined video with selected friends.

The synchronizing server implements the following tasks to: receive a service request, obtain the tune as identified by the service request, analyze the tune to detect and cluster similar beats, select a group of clustered beats for synchronization, generate a service request, and send the same to the electronic device. In an embodiment, when the data of a tune is transmitted from the electronic device, the synchronizing server may accept the tune as it is or may search for another tune which has the similar content but more desirable quality than the tune provided by the electronic device. For example, if the tune provided by the electronic device has a very low quality, the synchronizing server may search for the same tune but has a higher quality. In the situation that the length of the provided tune is shorter than the length of the video files, the synchronizing server may search for a similar tune that is a bit longer than the tune provided by the electronic device.

According to another embodiment, the transmission of the audio data of the tune from the electronic device to the synchronizing server may be implemented at the time when a service request is sent to the synchronizing server or may be implanted at a previous time before a service request is sent. For example, the electronic device 104 may maintain a list of favorite songs of the user based on the user's selection or a listening history of songs. Those favorite songs may be transmitted to the synchronizing server periodically such that when a service request is sent to the server, the server has already had a copy of the actual tune. In another embodiment, only meta data of a tune is sent to a synchronizing server, the synchronizing server may obtain the actual audio data from another source based on the meta data of a tune.

The combination of consumer-made videos file with a tune has certain interesting considerations. As a common observation, the plurality of video files stored on the electronic device 104 are often taken by the users at various occasions in an improvised manner. The start point and the end point of these video files may not be accurately timed, which means the video files could undergo some editing at the beginning or the end without affecting the real subject matter in those video files. These video files likely have a relatively short length, ranging from a few seconds to less than a minute, and have no associated tunes or background music. At the same time, as each of the video file represents a focused subject of the user, the user's interests in displaying these video files need to be preserved in the processing of the synchronizing server.

Figure 4:
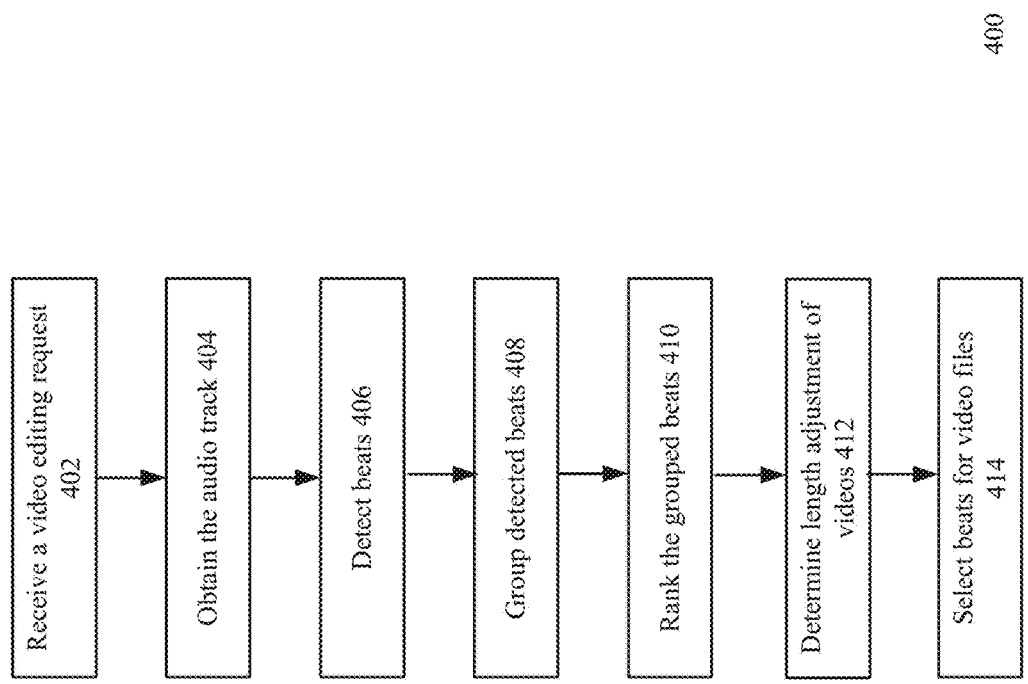
FIG. 4 illustrates a synchronization algorithm of the synchronizing server according to an embodiment of the present application.

FIG. 4 illustrates a series of algorithms 400 implemented at the synchronizing server 108 according to an embodiment of the present application. At step 402, the synchronizing server receives a service request, which includes meta information of a plurality of video files, length of each video file, and a display order of the plurality of video files. In one embodiment, the meta information of video files may be the title, recording date, or location of those video files. In another embodiment, to further reduce the network traffic, the electronic device 104 is configured to assign a unique value, such as an integer, to each selected video file and use the unique value as the meta information of those video files during the communication with the synchronizing server. The display order of those video files may be random, which means that the synchronizing server is free to adjust the display order of each video file or may be specific, which means that those video files need to be displayed according to a sequence set by the user. In one embodiment, the service request may include a dedicated data field for the display order. In another embodiment, the service request may simply use the order of each video file included in the service request to indicate the display order of those video files. The service request also includes meta information of a tune, such as the title of the tune, the artist, and file format. The service request may optionally include the actual data of the tune.

At step 404, the synchronizing server may request the actual data of the tune indicated by the service request to be transmitted from the electronic device or may request the actual data of the tune to be transmitted from a local database or from a third party database. In one embodiment, a user who has a subscription to the service of the synchronizing server provides a list of favorite songs or a copy of those favorite songs to the synchronizing server such that the synchronizing server can store those favorite tunes of a user before a service is requested.

Figure 5A:
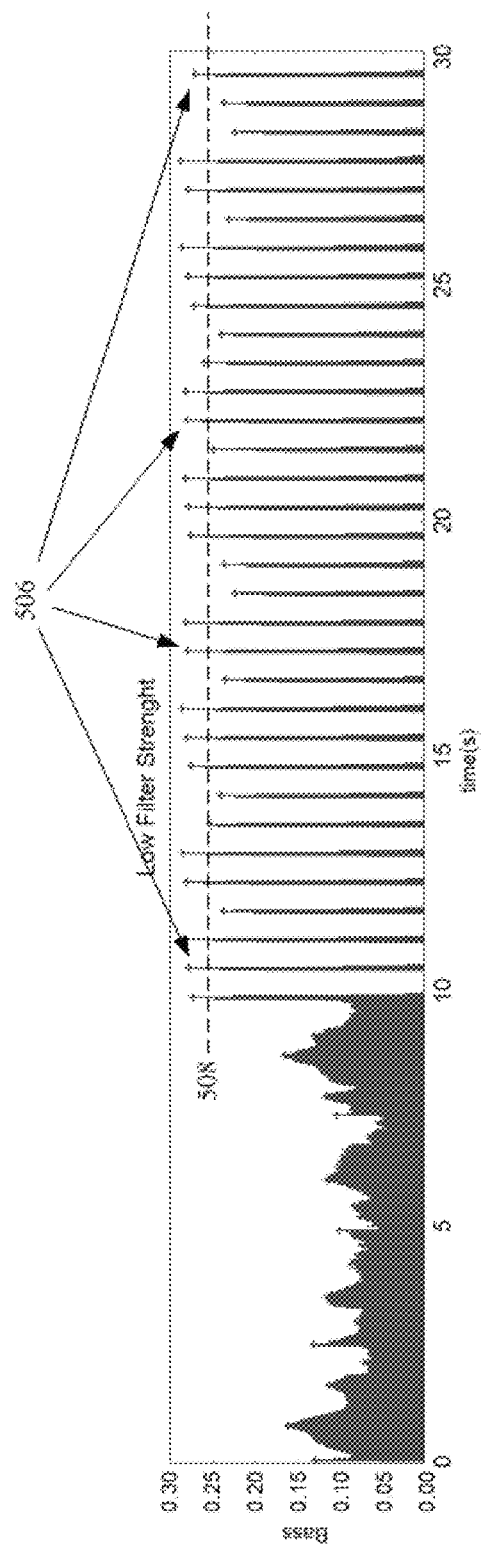
FIG. 5a illustrates detected beats according to a bass method.
Figure 5B:
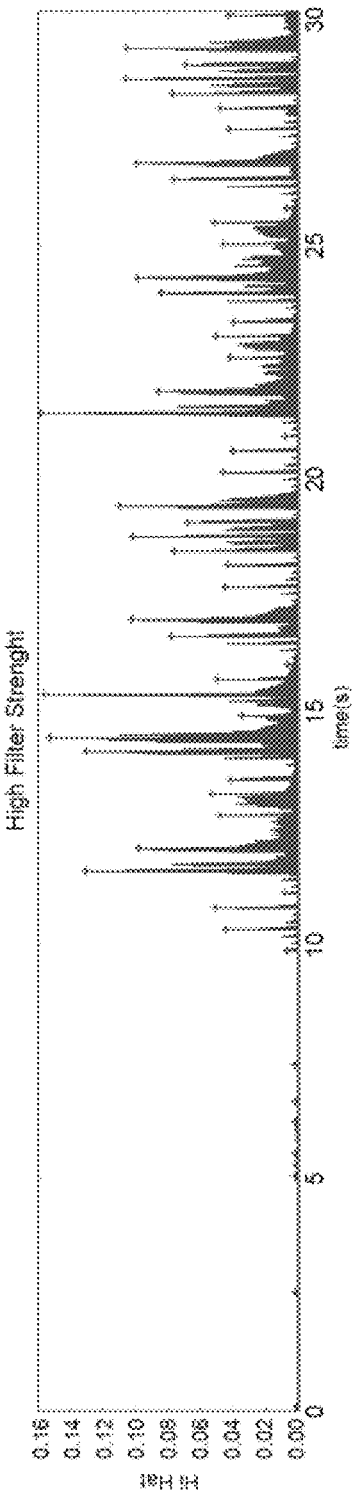
FIG. 5b illustrates detected beats according to a treble method.

At step 406, the synchronizing server first detects a plurality of beats from the tune by using various detection methods. The term "beat" as used in the present application refers to a time frame when an electronic signal of the tune, at that location, is over a predetermined threshold. For example, an onset method may be used to recognize volume differences in the tune and extracts corresponding time frames when the volume change is over a pre-determined threshold. A treble method may be used to recognize high frequency signals and extracts the time frame when it is occurs. A bass method may be used to recognize low frequency signals and extracts the time frame when it is occurs. FIG. 5a illustrates beats detected from a 30-second tune according to the bass method. The horizontal axis of FIG. 5a represents the time, while the vertical axis of FIG. 5a represents a relative value that is normalized to the intensity of the tune. The beats are identified in FIG. 5a as crosses 506. As shown in FIG. 5a, the time interval between two adjacent beats is shorter than 1 second such that the algorithms will have enough flexibility in selecting beats to match with a video file. The threshold used by the bass method may be adjusted to detect beats of various time intervals. FIG. 5b represent illustrates beats detected from the same 30-second tune according the treble method. The comparison between FIG. 5a and FIG. 5b shows that the plurality of beats detected by the tremble method are at time frames different from the bass method. It is understood by a person of ordinary skill in the art that those beat detection methods used by step 404 are well known to a person of ordinary skill in the art. Thus, details of these beat detection methods are not provided in the present application.

As shown in FIG. 5a, the plurality of detected beats detected by the bass method may not be similar to each other because the values corresponding to the plurality of detected beats varies greatly. For example, a subset of the detected beats have a relative frequency of about 0.275, while other subsets of the detected beats can be found at relative frequencies of about 0.23, 0.16, and 0.08, respectively. Similar observations may also be found in FIG. 5b for the treble method. As beats at different values will produce different perception effects in a user, it is desirable to synchronize the video files with a subset of detected beats that have similar features, such as similar frequencies or volumes, such that a user would perceive that the synchronization is carried out in a consistent manner. For example, in a very rough clustering way, beast 506 in FIG. 5a may be clustered into two groups according to a dash line 508 on FIG. 5a. The beats that are above the dash line 508 may be clustered into one group because their values are similar to each other, while the rest beat that are below the dash line 508 may be clustered into another group.

At step 408, the synchronizing server clusters the plurality of detected beats into a number of groups or vectors each having beats of similar features, such as frequency range or intensity difference. Each group or vector includes a plurality of beats that have their location and intensity data, respectively. The number of groups may be determined based on the number of video files and the number of detected beats such that each group is likely to have enough beats to match with the total number of starting points and end points of the video files. For example, the plurality of detected beats 506 as shown in FIG. 5a may be pre-clustered into 10 groups or vectors.

At step 410, the synchronizing server selects a group of beats to be used for the synchronization with the video files. Step 410 first discards a predetermined number of groups with a low intensity, which are unlikely to create strong emotional effects in a user's feeling. For example, step 410 may calculate an aggregated strength of the beats in each group and then discard the two groups that have the weakest strength. After the weakest groups are discarded, step 410 then calculates a rank for each of the rest groups to reflect how well the beats of each group may match with those video files. The calculation aggregates a plurality features of the beats in a same group, such as strength of a group, the distance (interval) between extremities of the group (such as the first beat and the last beat of the group), the distance (interval) between adjacent beats, and the average intensity change between two adjacent beats. In an embodiment, each factor is included in the calculation through a weight. The strength factor, in general, has a higher weight than the other factors. Step 410 then selects the group having the highest rank to be synchronized with the plurality of video files. In one embodiment, the group that has the highest strength is assigned with the highest rank. In another embodiment, the group that covers the longest time period is assigned the highest rank.

At step 412, the length of video files is adjusted because the length of the song and the total length of the selected video files often do not match with each other. In one embodiment, when the total length of the selected video files is longer than the tune, the length of each video file is proportionally trimmed to match with the length of the tune. In another embodiment, when the total length of the selected video files is shorter than the tune, the length of the tune is adjusted such that the total length of the video files matches with the tune. For example, the playback speed of a tune or a portion of a tune may be increased to shorten the playback time of a tune.

Figure 6:
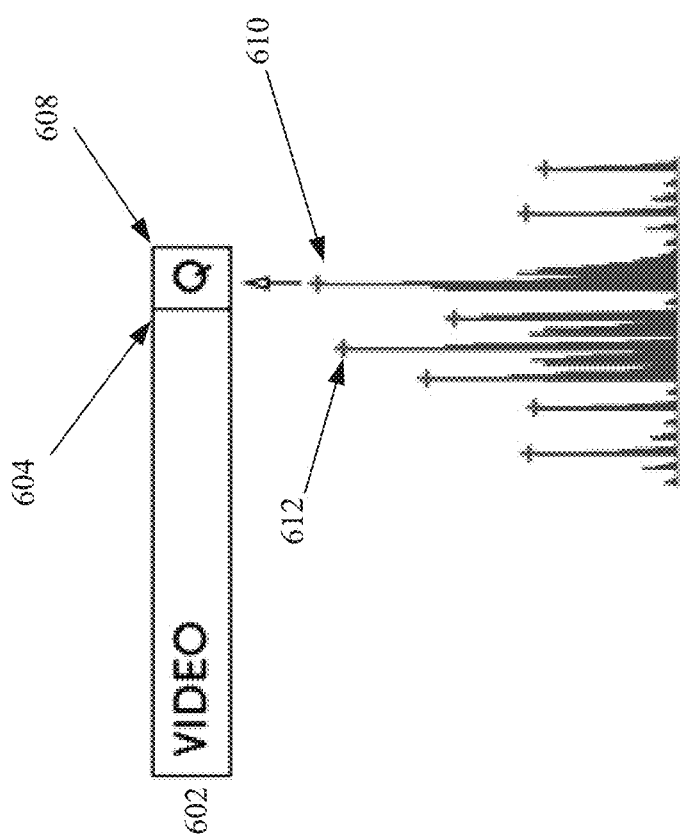
FIG. 6 illustrates a beat selection method according to an embodiment of the present application.

At step 414, the synchronizing server selects beats for each video file. In one embodiment, the display order of the video files that is set by the user is not changed. From the service request, the synchronizing server knows the length and display order of each video file. Step 414 starts with the first video file and selects the first available beat in the group to match with the start point of the first video file. Step 414 uses the length of the first video file to find a beat that is close to the end point of the first video file. When a beat is unavailable at the exact time when the first video file ends, step 414 searches neighboring beats with the same group to select a matching beat. The search may be limited to a predetermined length of a corresponding video file, such as + or −10% of the ending point. FIG. 6 illustrates a search expansion according to an embodiment of the present application. The video file 602 has an end point 604 that is between two beats 612 and 610 of a selected group. To select a matching beat, the end point of the video file 602 is extended by a predetermined search length Q 608, such that the beat 610 is within the extended period 608 and may be selected as a beat that matches with the end point of 604.

When the search does not find a suitable beat even with the expanded search period, step 414 will retrieve a lower level group, such as the group having the second highest rank, and then try to select a beat that matches the end point of the corresponding video file. Step 414 sequentially selects the matching beats for each video file according to the display order of those video files until the last video file. After step 414 selects matching beats for all video files, step 414 generates a service response and sends the service response to the electronic device. The service response includes information about the matching beats, such as time frame of those beats, trimming information of each video file, and information about inserted blank period after each video file. The electronic device, after receiving the service response, uses a video editing program to combine the plurality of video files and the tune according to the information included in the service response.

Figure 7:
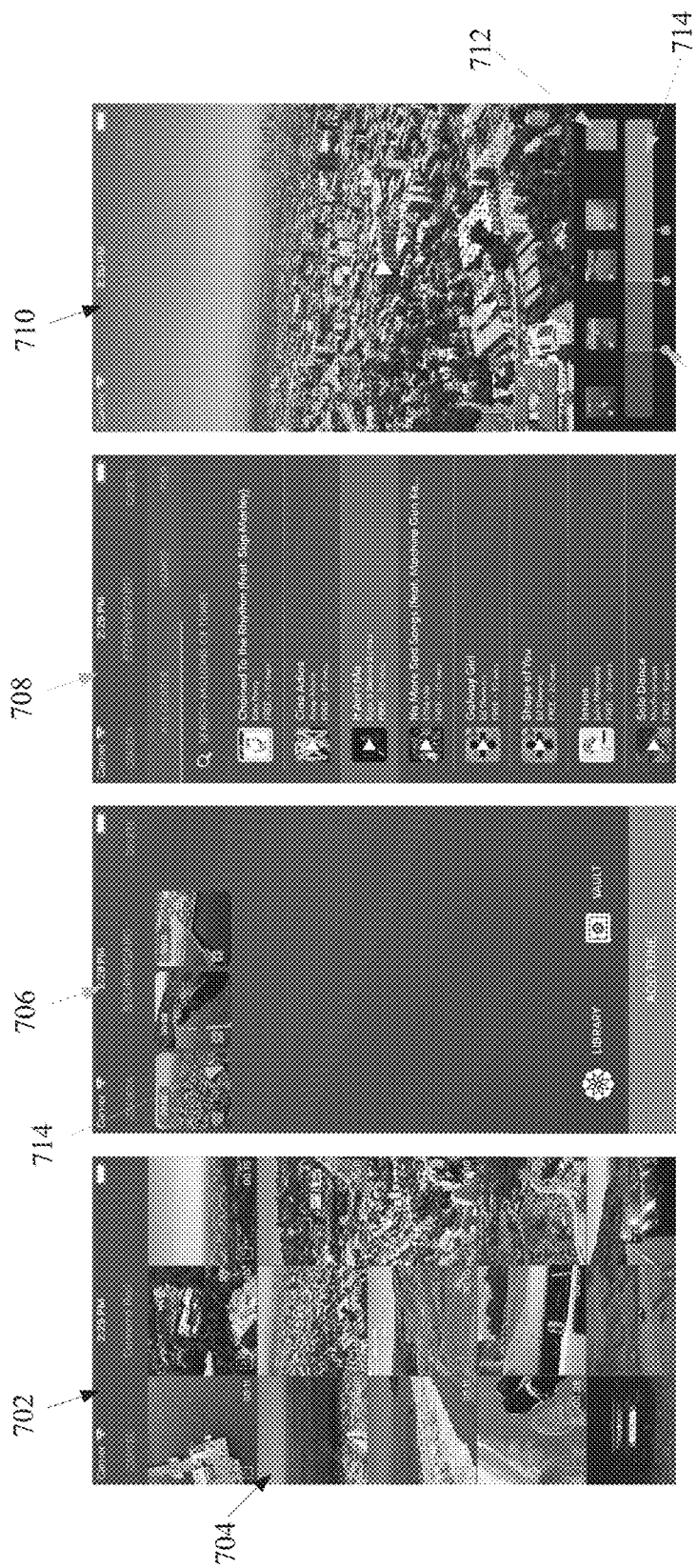
FIG. 7a illustrates a user interface of a mobile application configured for a user to select video files.
FIG. 7b illustrates a user interface of a mobile application configured for a user to arrange selected video files.
FIG. 7c illustrates a user interface of a mobile application configured for a user to select a tune.
FIG. 7d illustrates a user interface of a mobile application that presents synchronized video files with a tune.

FIGS. 7a-d illustrates a plurality of computer interfaces of a mobile application installed at the electronic device for the user to send and receive a service request to the synchronizing server according to an embodiment of the present application. FIG. 7a illustrates an interface 702 that allows the user to select a plurality of video files 704 for editing. The interface 702 may retrieve the video files 704 from a local storage medium or may retrieve the video files 704 from a cloud storage. The length information of each video file is also shown to a user. FIG. 7b illustrates an interface 706 for a user to organize selected video files. A user may use the interface 706 to change the display order of the selected video files and check the total length of the selected video files. FIG. 7c illustrates an interface 708 that allows a user to select a tune for the video files. In an embodiment, the interface 708 may retrieve every song available to the user and present them to the user. The interface 708 may first retrieve only those favorite songs by a user and then retrieve more songs upon the instructions from the user. In an embodiment, the interface 708 allows a user to select a detection method for detecting beats from a tune. After a user selects a tune from the interface 708, a service request is generated and sent to the synchronizing server, which replies with a service response that includes the information of matching beats corresponding to each video file. FIG. 7d illustrates an interface 710 that presents the combined and synchronized video files and a tune to the user. At the lower portion of the interface 710, the selected videos files 712 are shown together with the tune 714. In addition, the locations of the matching beats 716 are also shown along the tune 714.

Various embodiments are readily conceivable in view of the teachings of the present application. For example, the synchronization between a video file and selected beats may include changing the speed of a video file to fit selected beats. For example when the distance between two beats is 6 seconds, but the length of the video file is 10 seconds, the algorithm may determine to speed up the video file to match those beats, either throughout the entire video file or just through a portion of the video file. This same algorithm is also applicable when slowing down the speed of a video file to fit the video file with beats that have shorter distance. In this embodiment, the service request may include the information about the play speed of each video file.

In another embodiment, the display order of the video files may be rearranged to fit to the selected group of beats. In yet another embodiment, the algorithm may decide to skip portions of a video file then starting the video file on the next beat. In another embodiment, the synchronizing service may determine characteristic objects in the video file, such as human face or a landmark, then trim the video file according to the time frame associated with these characteristic objects. In another embodiment, the synchronizing server may recognize monotonous parts of the video file, for example similar frames for a long period of time, and then speed these parts up to optimize for fitting the beats.

In another embodiment, the synchronizing server may suggest a plurality of tunes to the user that better fit the length and arrangement of the user's clips. The synchronizing server may also infer which type of beat (bass, treble, onset) is likely to be the best for an individual user through a machine learning process. To implement these intelligent functions, the synchronizing server may preferably have a learning capability that is able to optimize its analysis of a tune based on how other users have used that tune. For example, the machine learning process will learn from other use of the synchronizing server by other users and can use the length of a video file, content of the video file, and any given song as input features.

In yet another embodiment, the division of tasks between the synchronizing server and the electronic device is not required. All the processing related to the present application may be implemented at the electronic device.

In yet another embodiment, the present application allows a user to keep an original audio track in a particular video file. For example, when a user records a video, the user may have already had his or her favorite song played during recording, and the user would like to keep that favorite song when that particular video file is subsequently being edited together with other video files to share a common tune. In this situation, the mobile application installed at the electronic device provides a function, such as a toggle or a button 714 in FIG. 7b. The toggle 714 allows a user to make a selection of whether to keep the original audio track of a video file. The user's selection is included in the service request sent to the synchronizing server, which will use this information for combining the tune with the video files. In one embodiment, the synchronizing server first implements the routine analysis of the tune and selects beats for synchronizing with the video files. After the matching beats are selected, the synchronizing server will add an additional attribute to the service response to indicate that the original audio track of the particular video file is to be reused. After receiving the service response, the mobile application will replace the main tune by the original sound track when the particular video file is processed.

Figure 8:
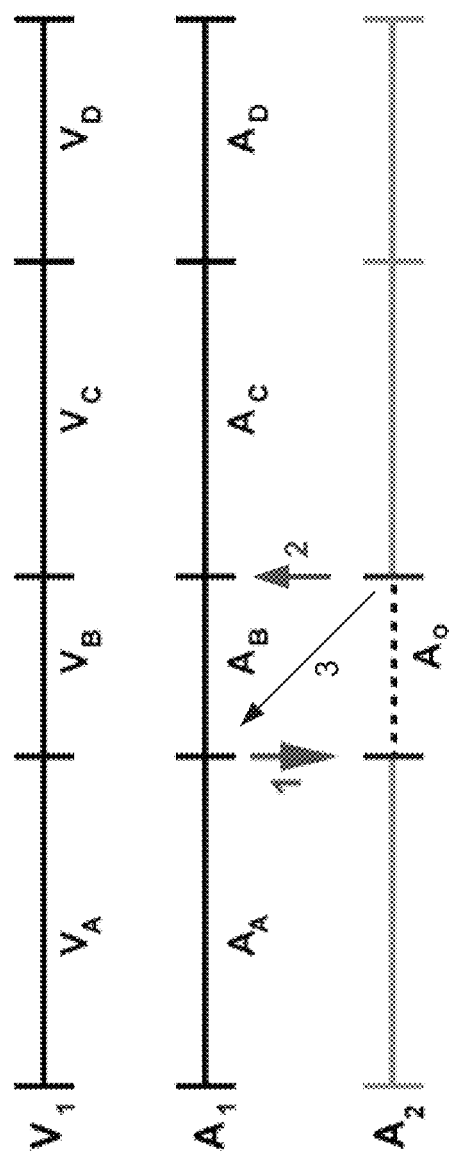
FIG. 8 illustrates a method of keeping an original audio track according to an embodiment of the present application.

FIG. 8 illustrates a method of keeping an original audio track according to an embodiment of the present application. The combined video file $V_1$ includes a plurality of video files, such as $V_A$, $V_B$, $V_C$, and $V_D$. A main tune $A_1$ is selected as the back ground music of the video file $V_1$, among which $A_A$, $A_B$, $A_C$, and $A_D$ have been determined by the synchronizing server to match $V_A$, $V_B$, $V_C$, and $V_D$, respectively. The user, however, would like to keep the original audio track $A_O$ for the video file $V_B$. The service response will include additional attributes for the video $V_B$ such that when the video file $V_B$ are edited locally at the electronic device, the local video editing function will switch to the original audio track $A_O$ at the beginning time 1 of the video file $V_B$ and switch back to the main tune at the ending time 2 of the video file $V_B$.

In another embodiment, the original audio track may not replace the main tune, but may be inserted into the main tune. For example, after the ending time of the video file $V_B$, the audio track will go back to where the tune is stopped, which is shown as the arrow 3 in FIG. 8, and play the tune from the point where it is stopped. In this method, the continuity of the tune will be maintained. To achieve the continuity, the synchronizing server needs to ignore the length of the video file $V_B$ in selecting beats for the other video files. An issue associated with this method is that the length of the audio data to be added to the video files is increased when an original audio track is to be used. An adjustment of the length of the video files or the audio data may need to be subsequently implemented to match the length of the audio data with the video files.

In another embodiment, the present system may further has a database that stores a collection of tunes with short length, such as a few seconds. When a user uses the interface 708 to select a tune for the video files, a list of the stored tunes in the database may be provided to the user, who is allowed to select a tune for each of the selected video files.

While this invention has been described in conjunction with the specific embodiments outlined above, it is evident that many alternatives, modifications, and variations will be apparent to those ordinarily skilled in the art. Accordingly, the preferred embodiments of the invention as set forth above are intended to be illustrative, not limiting. Various changes may be made without departing from the spirit and scope of the inventions as defined in the following claims.

What is claimed is:

1. A method for combining a plurality of video files with a tune, comprising:
    transmitting a service request from an electronic device to a synchronizing server, wherein the service request includes meta information of a plurality of video files, a display order of the plurality of video files, and meta information of a tune,
    detecting a plurality of beats from the tune; and
    selecting, from the plurality of beats, a set of beats for synchronizing with the plurality of the video files; and
    transmitting a service response from the synchronizing server to the electronic device, wherein the service response includes time frames associated with the set of beats;
    clustering the plurality of detected beats into a plurality of groups; and
    assigning a rank to each of the plurality of groups, the rank being calculated based on a strength of beats included in each group, a distance between adjacent beats of each group, and a distance between extremities of each group.

2. The method of claim 1, wherein the service request includes length information of the plurality of the video files.

3. The method of claim 1, wherein video data of the plurality of the video files is not transmitted to the synchronizing server.

4. The method of claim 1, wherein the service request further includes a beat detection method selected by a user.

5. The method of claim 1, wherein the detecting step detects the plurality of beats according to an onset method, a bass method, or a treble method.

6. The method of claim 1, wherein the selecting step further comprises:

determining a total length of the plurality of video files; and adjusting the total length of the plurality of video files to the length of the tune.

7. The method of claim 6, wherein, when the total length of the plurality of video files is longer than the length of the tune, the plurality of video files are proportionally trimmed.

8. The method of claim 6, wherein, when the total length of the plurality of video files is shorter than the length of the tune, the length of the tune is adjusted.

9. The method of claim 1, wherein the set of beats are selected from a first group that has the highest rank.

10. The method of claim 9, wherein the selecting step searches a predetermined range around an end point of a video file for a suitable beat.

11. The method of claim 9, wherein, when the first group fails to produce a suitable beat for a video file, the selecting step searches a beat within a second group that is at an immediate lower level than the first group.

12. A non-transitory recording medium storing an executable program which, when executed, causes a computer to implement a method for combining a plurality of video files with a tune, the method comprising:

transmitting a service request from an electronic device to a synchronizing server, wherein the service request includes meta information of a plurality of video files, a display order of the plurality of video files, and meta information of a tune, detecting a plurality of beats from the tune; and selecting, from the plurality of beats, a set of beats for synchronizing with the plurality of the video files; and transmitting a service response from the synchronizing server to the electronic device, wherein the service response includes time frames associated with the set of beats; and clustering the plurality of detected beats into a plurality of groups; and assigning a rank to each of the plurality of groups, the rank being calculated based on a strength of beats included in each group, a distance between adjacent beats of each group, and a distance between extremities of each group.

13. The recording medium of claim 12, wherein the service request includes length information of the plurality of the video files.

14. The recording medium of claim 12, wherein video data of the plurality of the video files is not transmitted to the synchronizing server.

15. The recording medium of claim 12, wherein the service request further includes a beat detection method selected by a user.

16. The recording medium of claim 12, wherein the detecting step detects the plurality of beats according to an onset method, a bass method, or a treble method.

17. The recording medium of claim 12, wherein the selecting step further comprises:

determining a total length of the plurality of video files; and adjusting the total length of the plurality of video files to the length of the tune.

18. The recording medium of claim 17, wherein, when the total length of the plurality of video files is longer than the length of the tune, the plurality of video files are proportionally trimmed.

19. The recording medium of claim 17, wherein, when the total length of the plurality of video files is shorter than the length of the tune, the length of the tune is adjusted.

20. The recording medium of claim 12, wherein the set of beats are selected from a first group that has the highest rank.

21. The recording medium of claim 20, wherein the selecting step searches a predetermined range around an end point of a video file for a suitable beat.

22. The recording medium of claim 20, wherein, when the first group fails to produce a suitable beat for a video file, the selecting step searches a beat within a second group that is at an immediate lower level than the first group.

* * * * *